(12) United States Patent
Rinne et al.

(10) Patent No.: US 6,628,532 B1
(45) Date of Patent: Sep. 30, 2003

(54) DRIVE CIRCUIT FOR A VOLTAGE-CONTROLLED SWITCH

(75) Inventors: Karl Rinne, Waterford (IE); Peter Bardos, Cork (IE)

(73) Assignee: Artesyn Technologies, Inc, Boca Raton, FL (US)

( * ) Notice: Subject to any disclaimer, the term of this patent is extended or adjusted under 35 U.S.C. 154(b) by 224 days.

(21) Appl. No.: 09/633,919

(22) Filed: Aug. 8, 2000

(51) Int. Cl.⁷ .............................................. H02M 3/335
(52) U.S. Cl. ....................... 363/21.06; 363/53; 363/127
(58) Field of Search .............................. 363/17, 21.06, 363/21.14, 25, 52, 53, 125, 127

(56) References Cited

U.S. PATENT DOCUMENTS

| | | |
|---|---|---|
| 5,274,543 A | 12/1993 | Loftus, Jr. |
| 5,590,032 A | 12/1996 | Bowman et al. |
| 5,635,867 A | 6/1997 | Timm |
| 5,742,491 A | 4/1998 | Bowman et al. |
| 5,872,705 A | 2/1999 | Loftus, Jr. et al. |
| 6,011,703 A | 1/2000 | Boylan et al. |
| 6,023,158 A | 2/2000 | Liu |
| 6,038,148 A * | 3/2000 | Farrington et al. ..... 363/127 X |
| 6,069,799 A | 5/2000 | Bowman et al. |
| 6,091,616 A | 7/2000 | Jacobs et al. |
| 6,304,463 B1 * | 10/2001 | Krugly ..................... 363/21.06 |

\* cited by examiner

*Primary Examiner*—Jessica Han
(74) *Attorney, Agent, or Firm*—Kirkpatrick & Lockhart LLP

(57) ABSTRACT

A drive circuit for a voltage-controlled switch. The drive circuit includes a normally-on switch including first and second terminals and a control terminal, wherein the first and second terminals have a conduction path therebetween, the second terminal is connected to a conduction control terminal of the voltage-controlled switch, and the control terminal of the normally-on switch is biased by a drive voltage relative to the first terminal of the normally-on switch.

9 Claims, 9 Drawing Sheets

DRIVE CIRCUIT FOR A VOLTAGE-CONTROLLED SWITCH

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF INVENTION

1. Field of Invention

The present invention relates generally to drive circuits for voltage-controlled switches and, more particularly, to drive circuits which provide protection of the voltage-controlled switches from excessive voltages at their conduction control terminals.

2. Description of the Background

A voltage-controlled switch is controlled by applying a voltage to its conduction control terminal (called the gate for a field effect transistor). Practical voltage-controlled switches, such as metal-oxide-semiconductor field effect transistors (MOSFETs) or insulated-gate bipolar transistors (IGBTs), pose limits to the control voltage applied to the conduction control terminal. Even short-duration voltage levels beyond these limits may lead to reliability problems or destruction of the switch.

Quite frequently, gate drive voltage levels delivered by gate drive circuits are not well controlled, and can vary over a relatively wide range. If this range extends beyond the maximum gate levels of the switch, a gate voltage protection circuit is required.

A prior art gate voltage clamping circuit is shown in FIG. 1. Bipolar voltage clamping is achieved using Zener diodes 10, 12. If the voltage level of the drive voltage reaches the Zener voltage of the diodes 10, 12, both diodes 10, 12 start conducting, thus protecting the switch 14 from excessive gate voltage stress. Because of the "back-to-back" connection of the diodes 10, 12, one of the diodes 10 operates in forward mode, and the other diode 12 operates in avalanche mode during the clamping action. The drawback of this protection scheme is the power dissipation in the clamping diodes 10, 12, particularly if the output impedance of the gate drive circuit is low and/or the maximum unclamped voltage is high. Moreover, a low output impedance of the gate drive circuit is essential for high-speed switching of the switch 14.

A prior art unipolar drive circuit is shown in FIG. 2. A bipolar junction transistor (BJT) 16 is connected in an emitter-follower configuration. The base voltage of the BJT 16 is clamped to a defined level using a Zener diode 18 and a resistor 20. The maximum voltage applied to the gate of the switch 14 (with respect to its source) is approximately the Zener voltage level of the diode 18 minus the base-emitter junction voltage drop ($V_{be}$) of the BJT 16. Because the circuit provides no discharge path, an anti-parallel diode 22 is required to allow the gate drive circuit to discharge the gate of the switch 14. The primary drawback of this drive circuit is its relative complexity and the poor turn-on performance. The base current of the BJT 16 is limited by the resistor 20, which is required to control the power dissipation in the Zener diode 18. Another drawback of the circuit is that the voltage at the gate of the switch 14 is always reduced by one $V_{be}$ voltage drop, even if the drive voltage is low anyway. Steady-state power dissipation of the scheme can cause further problems.

Another prior art unipolar drive circuit is shown in FIG. 3. Enhancement MOSFET 24 is connected in a source-follower configuration. The gate of enhancement MOSFET 24 is positively biased using a voltage source 26. When a positive drive voltage ($V_{drive}$) is applied, the gate of the switch 14 follows this voltage up to a level equal to the bias voltage 26 minus the gate-source threshold voltage ($V_{gsthres}$) of the MOSFET 24. This circuit has several advantages. Neglecting the voltage source 26, complexity of the circuit is low. If an adequately sized enhancement MOSFET 24 is used, the turn-on drive impedance can be made very low. The circuit does not suffer from steady-state power dissipation. Even if a high drive voltage is supplied continuously, the enhancement MOSFET 24 is in cutoff mode, and no significant current is drawn. The disadvantage of the scheme is the necessity of the bias voltage source 26. Moreover, if a bias voltage source with a suitable voltage level is not available, the complexity of the circuit increases significantly.

Accordingly, there exists a need for an efficient, simple drive circuit for a voltage-controlled switch that has a low output impedance and low steady-state power dissipation.

SUMMARY OF THE INVENTION

The present invention is directed to a drive circuit for a voltage-controlled switch. According to one embodiment, the drive circuit includes a normally-on switch including first and second terminals and a control terminal, wherein, the first and second terminals have a conduction path therebetween, the second terminal is connected to a conduction control terminal of the voltage-controlled switch, and the control terminal of the normally-on switch is biased by a drive voltage relative to the first terminal of the normally-on switch. The normally-on switch may be, for example, a depletion mode MOSFET. The drive circuits of the present invention may be implemented in, for example, power converter circuits.

The present invention represents an advantage over prior art mechanisms for protecting the conduction control terminal of a voltage-controlled switch from excessive voltages because of its reduced complexity and efficiency. The present invention offers a further advantage of having a low output impedance and low steady-state power dissipation. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 4:
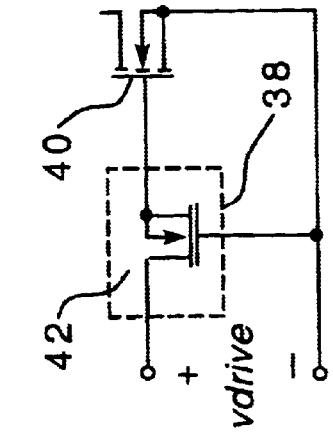

FIG. 4 is a schematic diagram of a drive circuit 38 according to one embodiment of the present invention for supplying a drive signal to the conduction control terminal of the voltage-controlled switch 40. The switch 40 may be any switch requiring protection from excessive voltages at its conduction control terminal such as, for example, a MOSFET, as illustrated in FIG. 4, or an IGBT. The drive circuit 38 includes an N-channel depletion mode MOSFET 42 having its drain and gate terminals responsive to the drive voltage and its source terminal connected to the conduction control terminal of the switch 40. When the gate-source voltage of the depletion mode MOSFET 42 is zero, the drain-source channel of the depletion mode MOSFET 42 is conductive, making it a "normally-on" device. The N-channel depletion mode MOSFET 42 may be turned off when a voltage more negative than the gate-source OFF voltage ($V_{gsoff}$) of the MOSFET 42 is applied to the gate terminal of the MOSFET 42.

When the gate drive voltage ($V_{drive}$) rises, the source terminal of MOSFET 42 follows, thereby applying voltage to the gate terminal of the switch 40. As the source voltage of MOSFET 42 rises, its gate-source voltage drops. As soon as the gate-source voltage of the MOSFET 42 reaches $V_{gsoff}$, the drain-source conduction channel becomes nonconductive, and MOSFET 42 is in the cutoff mode. Therefore, neglecting parasitic effects, the gate voltage of the switch 40 stays at an approximately constant level of $V_{gsoff}$ even if the drive voltage ($V_{drive}$) keeps rising. At turn-off of the switch 40, the gate of the switch 40 can be discharged by the gate drive circuit through both the inherent body diode of the MOSFET 42 (as long as it is forward biased) and through the conduction channel of the MOSFET 42 (as soon as its gate-source voltage exceeds $V_{gsoff}$). According to one embodiment, the gate-source OFF voltage $V_{gsoff}$ of the MOSFET 42 is considerably higher than the gate-source threshold of the switch 40.

The drive circuit 38 of FIG. 4 offers several advantages. Only one component is required for a unipolar over-voltage protection scheme for voltage-controlled switches. Furthermore, no additional bias voltage source is necessary. In addition, by selection of a suitable device, the turn-on impedance of the depletion mode MOSFET 42 can be controlled, and may be very small (essentially drain-source on resistance ($R_{dson}$) of the MOSFET 42). The turn-off impedance consists of the series impedance of the body diode of the MOSFET 42 and, therefore, may also be very small. Steady-state power dissipation with the drive circuit 38 of FIG. 4 is also negligible. When the drive voltage $V_{drive}$ is relatively low (i.e., lower than $|V_{gsoff}|$), no additional voltage drops are introduced by the drive circuit.

According to another embodiment of the present invention, the depletion mode MOSFET 42 may be a P-channel depletion mode MOSFET. The operation of the drive circuit 38 including a P-channel depletion mode MOSFET is similar to that of the drive circuit of FIG. 4, except that the P-channel depletion mode MOSFET is turned off when a voltage more positive than the gate-source OFF voltage ($V_{gsoff}$) of the MOSFET is applied to the gate terminal of the MOSFET 42.

Figure 5:
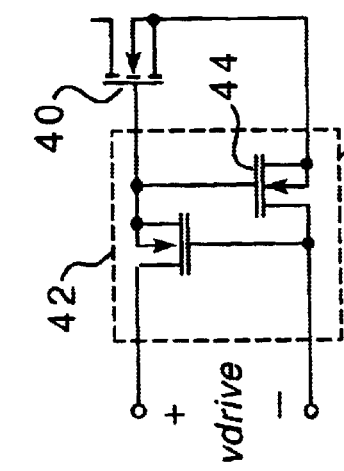

FIG. 5 is a schematic diagram of the drive circuit 38 according to another embodiment of the present invention. The drive circuit 38 of FIG. 5 includes a second depletion mode MOSFET 44 connected to provide, in conjunction with the depletion mode MOSFET 42, bipolar over-voltage protection of the switch 40.

Figure 3:
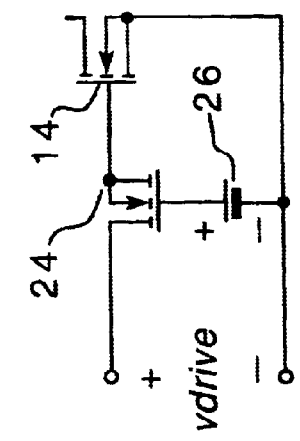
FIGS. 1–3 are schematic diagrams of prior art drive circuits for voltage-controlled switches.
Figure 2:
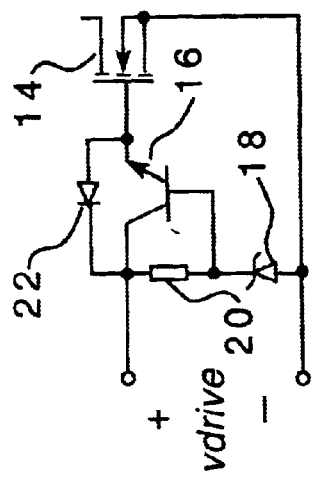
Figure 1:
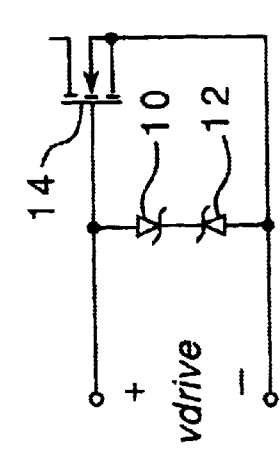
Figure 6:
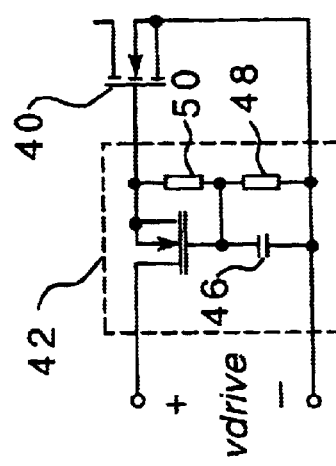
FIGS. 4–7 are schematic diagrams of drive circuits for voltage-controlled switches according to embodiments of the present invention.

FIG. 6 is a schematic diagram of the drive circuit 38 according to another embodiment of the present invention. The drive circuit 38 of FIG. 6 includes a capacitor 46 and a resistor 48 coupled in parallel to the gate terminal of the depletion mode MOSFET 42. The drive circuit 38 also includes a resistor 50 connected between the resistor 48 and the conduction control terminal of the switch 40 (i.e., in parallel with the gate-source junction of the MOSFET 42). The drive circuit 38 of FIG. 6 may be used, for example, where the gate-source OFF voltage ($V_{gsoff}$) of depletion mode MOSFET 42 is not high enough with respect to the gate-source threshold voltage ($V_{gsthres}$) of the switch 40. Using the resistors 48, 50, the maximum voltage level applied to the gate of the switch 24 may be controlled. The capacitor 46 compensates for the gate-source capacitance of the depletion mode MOSFET 42 and controls the rate of increase of the voltage applied to the conduction control terminal of the switch 40.

Figure 7:
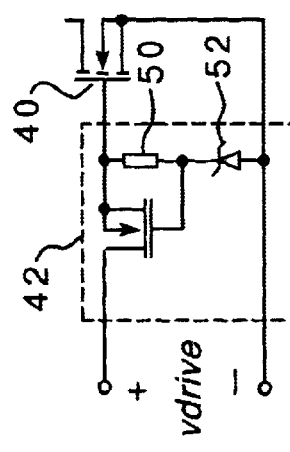

FIG. 7 is a schematic diagram of the drive circuit 38 according to another embodiment. For the drive circuit 38 of FIG. 7, the gate terminal of the depletion mode MOSFET 42 is clamped by a Zener diode 52, which is fed by the resistor 50. Other methods for biasing and controlling the gate voltage of the depletion mode MOSFET 42 may also be employed according to other embodiments of the present invention.

Figure 8:
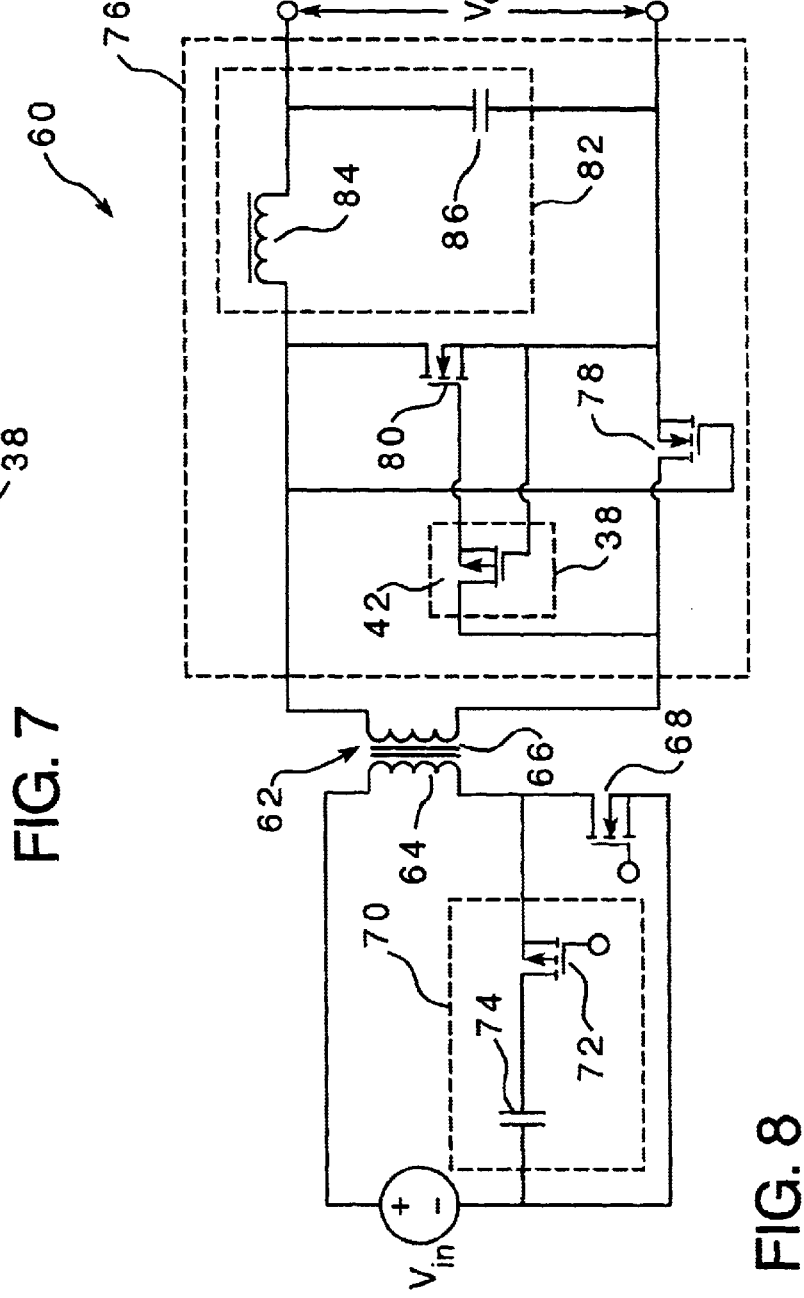
FIGS. 8–17 are schematic diagrams of power converter circuits according to embodiments of the present invention.

FIG. 8 is a schematic diagram of a power converter circuit 60 in which the drive circuit 38 of the present invention may be incorporated. The power converter circuit 60 illustrated in FIG. 8 is a single-ended, forward DC-DC converter, although the drive circuit 38 of the present invention may be incorporated in other types of power conversion topologies, such as described hereinbelow with respect to FIGS. 12–17. The circuit 60 in FIG. 8 includes an isolation transformer 62 having a primary winding 64 and a secondary winding 66. A primary input power switch 68, when biased, couples the input voltage $V_{in}$ to the primary winding 64. A reset circuit 70 (sometimes referred to as an "active clamp"), including a reset switch 72 and a capacitor 74, resets the core of the transformer 62 when the primary input power switch 68 is not biased. The primary switch 68 and the reset switch 72 may be, for example, MOSFETs, and may be cyclically biased by a control circuit (not shown) between conduction and non-conduction, respectively, to regulate the output voltage $V_o$. The control circuit may bias the primary input power switch 68 and the reset switch 72 such that they are not simultaneously conductive. U.S. Pat. No. 6,081,432, entitled "Active Reset Forward Converter Employing Synchronous Rectifiers", which is incorporated herein by reference, discloses such a control circuit.

The secondary side of the power converter circuit 60 includes a rectification circuit 76 for generating a DC output voltage $V_o$ from the voltage waveform induced on the secondary winding 66 of the transformer 62 from the primary winding 64. The rectification circuit includes a pair of synchronous rectifiers 78, 80 and an output filter 82, including an inductor 84 and a capacitor 86. The synchronous rectifiers 78, 80 may be, for example, MOSFETs. According to another embodiment, the synchronous rectifier 78 may be a rectifying diode. The rectification circuit 76 also includes the drive circuit 38 of the present invention to protect the voltage level applied to the conduction control terminal of the synchronous rectifier 80 by the secondary winding 66. In FIG. 8, the drive circuit 38 includes the depletion mode MOSFET 42 of the FIG. 4, although according to other embodiments of the present invention, the drive circuits 38 of FIGS. 5–7 may also be used to limit the voltage applied to the conduction control terminal of the synchronous rectifier 80.

In operation, when the primary input power switch 68 is biased conductive by the control circuit, the input voltage $V_{in}$ is applied to the primary winding 64, thereby inducing a voltage on the secondary winding 66 proportional to the turns ratio between the primary and secondary windings 64, 66. The positive voltage across the secondary winding 66 turns on the synchronous rectifier 78 and turns off the synchronous rectifier 80. During this cyclic period, the synchronous rectifier 78 conducts load current through the inductor 84.

When the primary input power switch 68 is turned off and the reset switch 72 is turned on, a negative voltage is applied to the primary winding 64. The negative voltage across the primary winding 64 induces a negative voltage on the secondary winding 66, which turns on the synchronous rectifier 80 and turns off the synchronous rectifier 78. During this cyclic period, the synchronous rectifier 80 conducts load current through the inductor 84. The depletion mode MOSFET 42 protects the synchronous rectifier 80 by limiting the voltage applied to the conduction control terminal of the synchronous rectifier 80 from the secondary winding 66. The control circuit may insert a delay between the time the primary input switch 68 turns off and the reset switch 72 turns on, and vice-versa, to ensure that the synchronous rectifiers 78, 80 are not simultaneously conducting.

Figure 9:
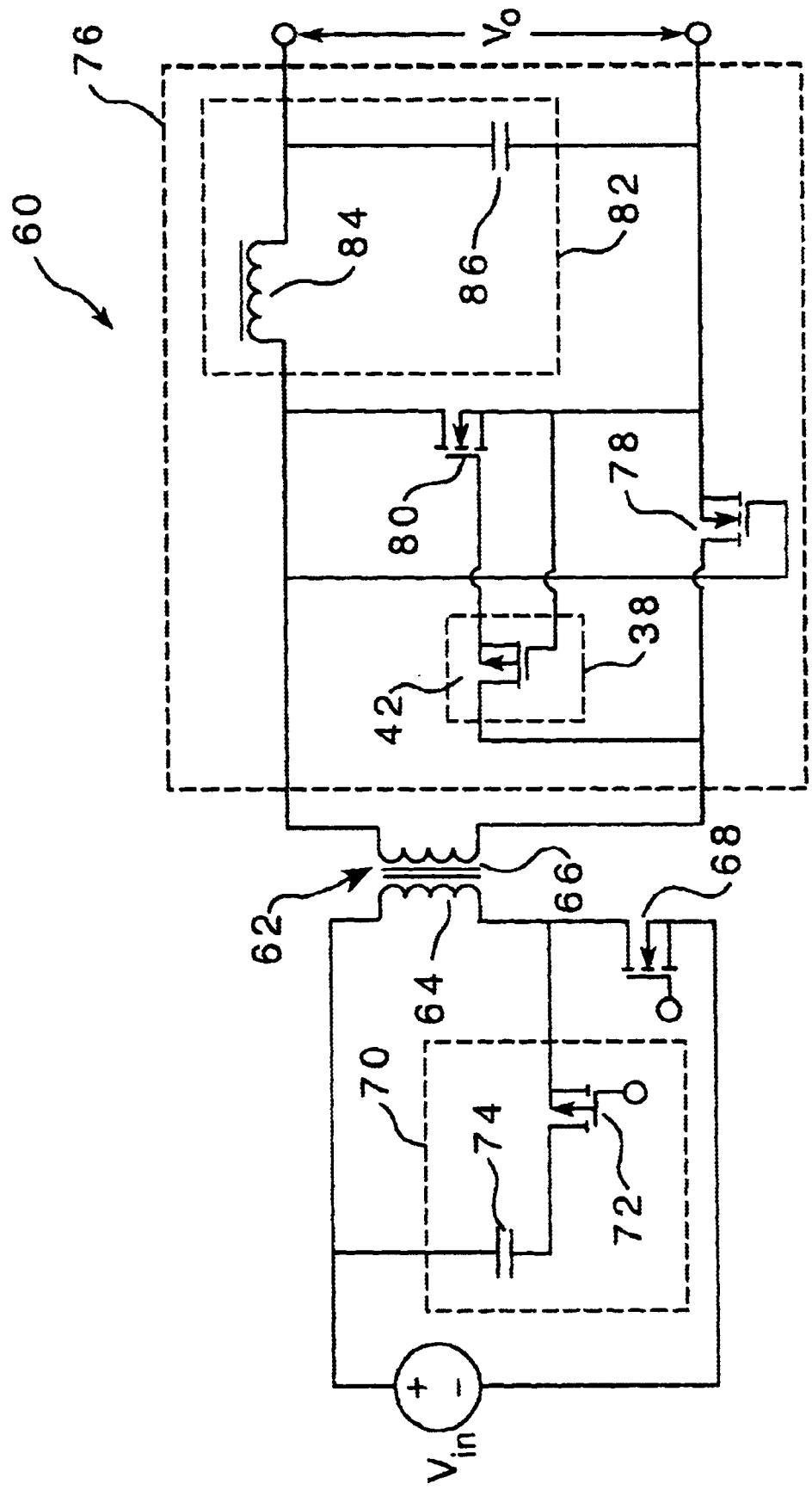
Figure 10:
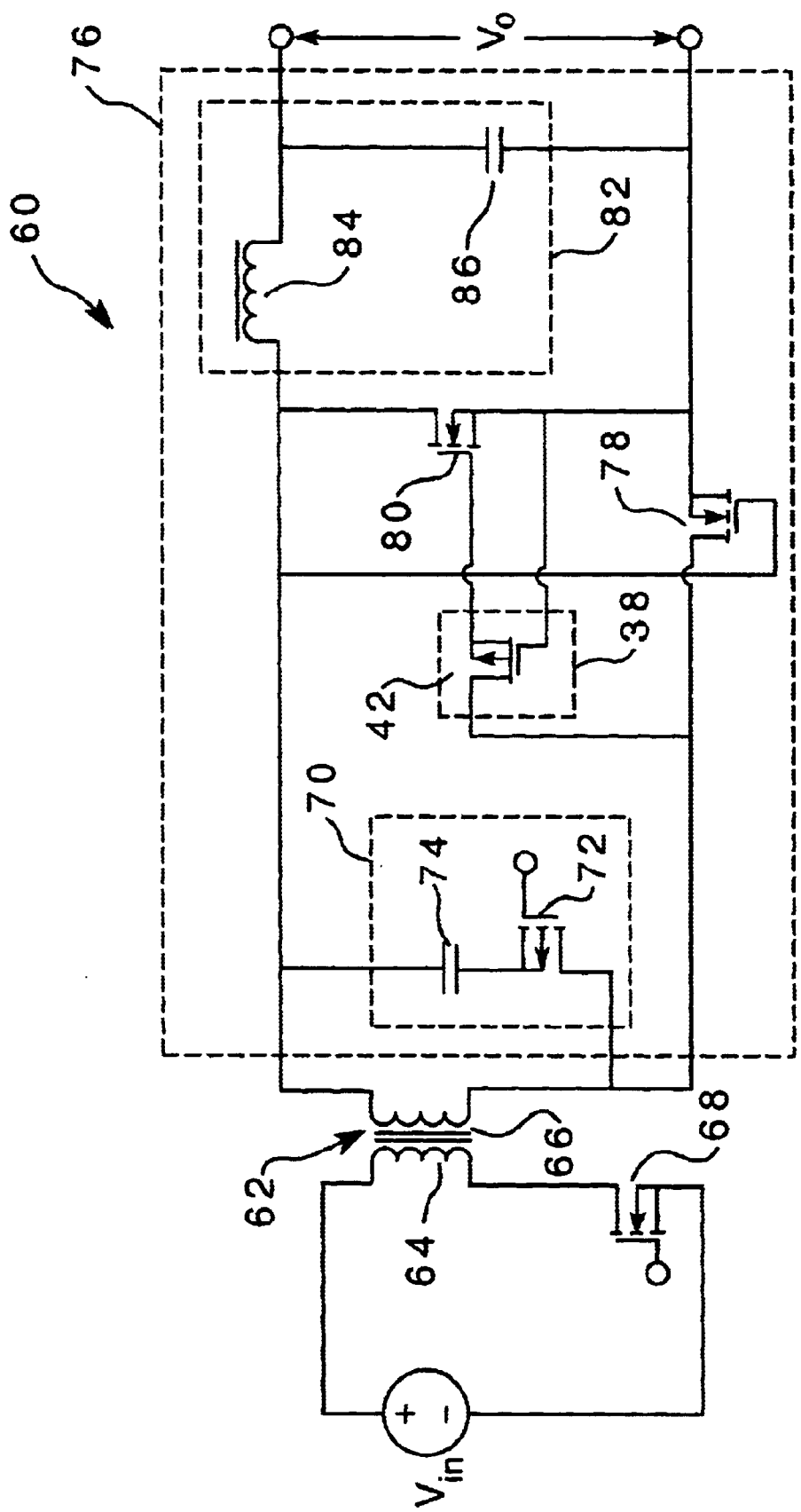

FIGS. 9 and 10 are schematic diagrams of the power converter circuit 60 according other embodiments of the present invention, showing alternative configurations for the reset circuit 70. In FIG. 9, the reset circuit 70 is in parallel with the primary winding 64 of the transformer 62. In FIG. 10, the reset circuit 70 is coupled to the secondary winding 66 of the transformer 62.

Figure 11:
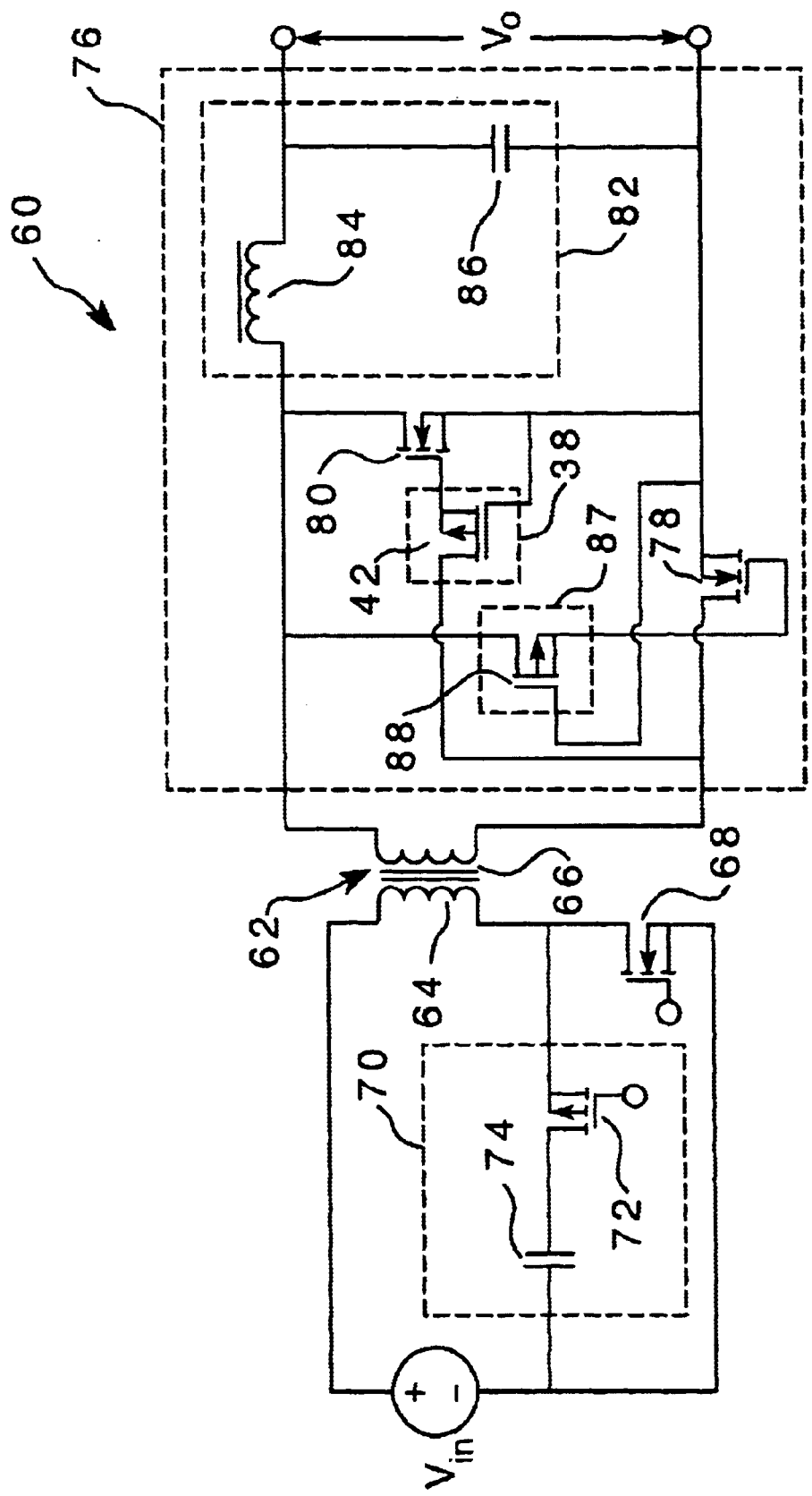

FIG. 11 is a schematic diagram of the power converter circuit 60 according to another embodiment of the present invention. The power converter circuit 60 of FIG. 11 is similar to that of FIG. 8, except that it includes a second drive circuit 87, comprising a depletion mode MOSFET 88, configured to limit the voltage applied to the conduction control terminal of the synchronous rectifier 78 from the secondary winding 66.

Figure 12:
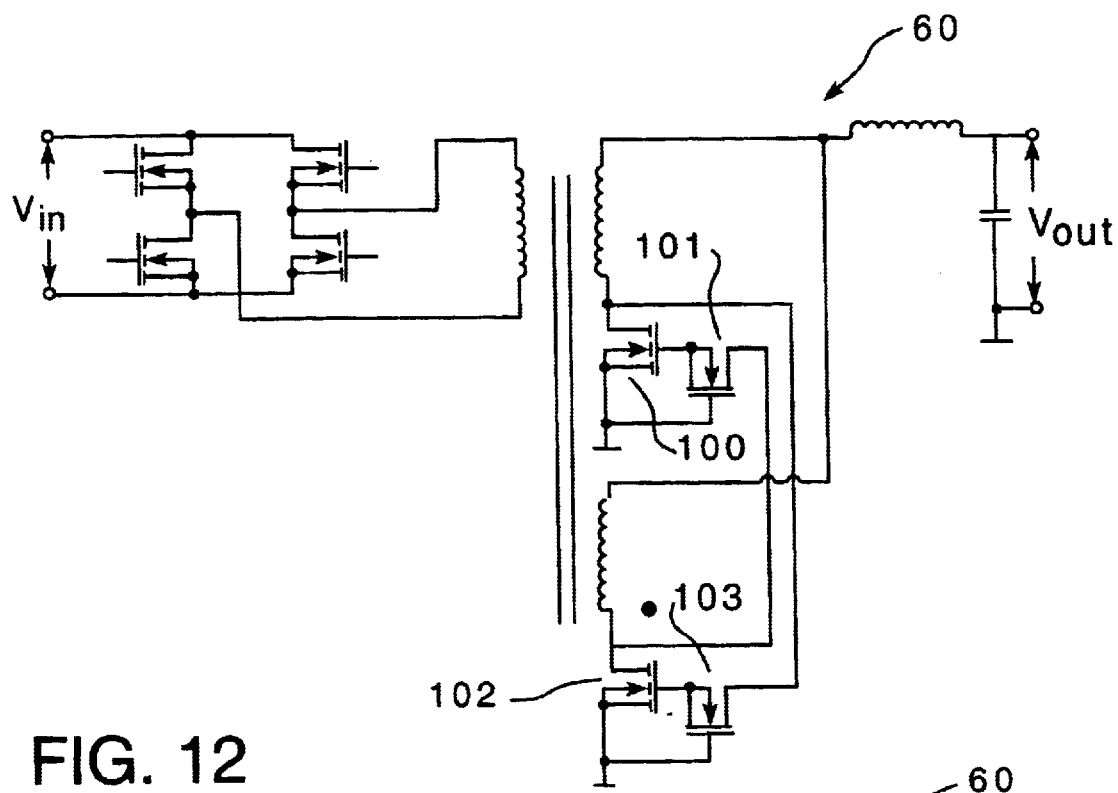

As mentioned hereinbefore, the drive circuit of the present invention may be incorporated in other types of power converter topologies. FIG. 12 is a schematic diagram of a full-bridge converter circuit 60 with full-wave rectification according to one such embodiment of the present invention. The power converter circuit 60 illustrated in FIG. 12 includes two drive circuits 100, 102 according to one embodiment of the present invention and two voltage-controlled switches 101, 103. The drive circuits 100, 102 illustrated in FIG. 12 include depletion-mode MOSFETs although, according to other embodiments, the drive circuits 38 of FIGS. 5–7 may also be used to limit the voltage applied to the conduction control terminal of the voltage-controlled switches 101, 103.

Figure 13:
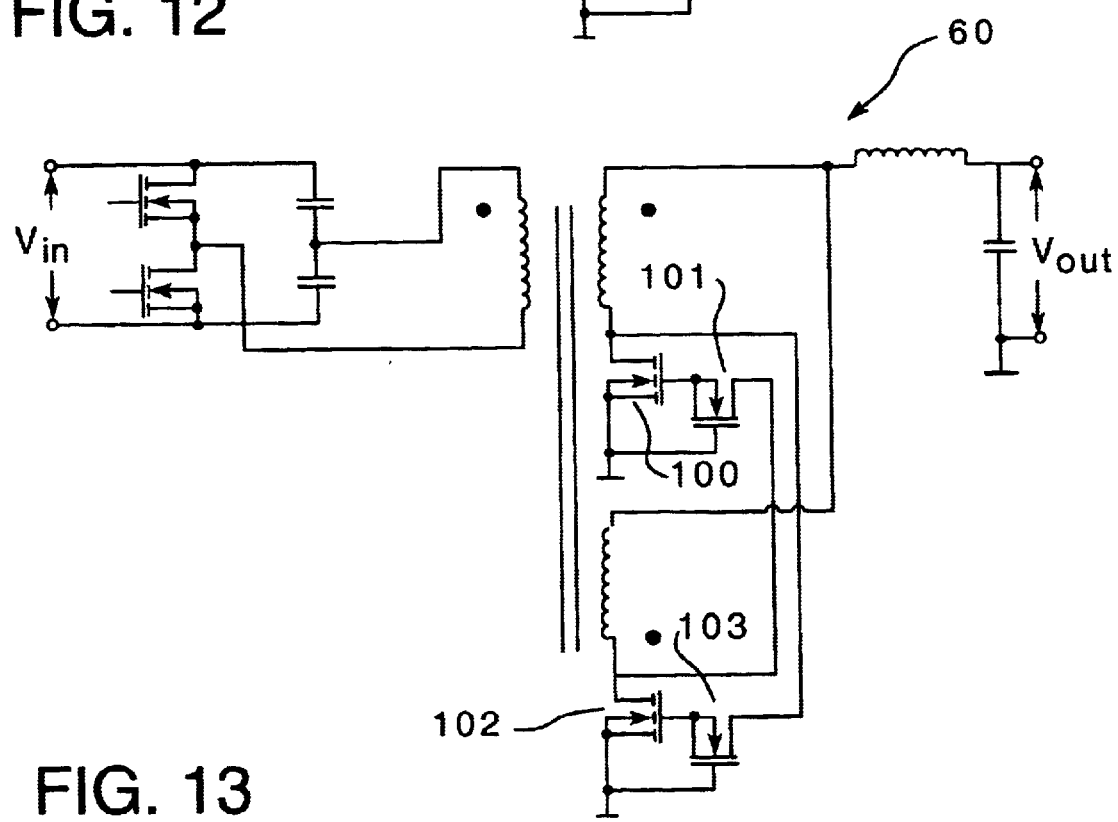
Figure 14:
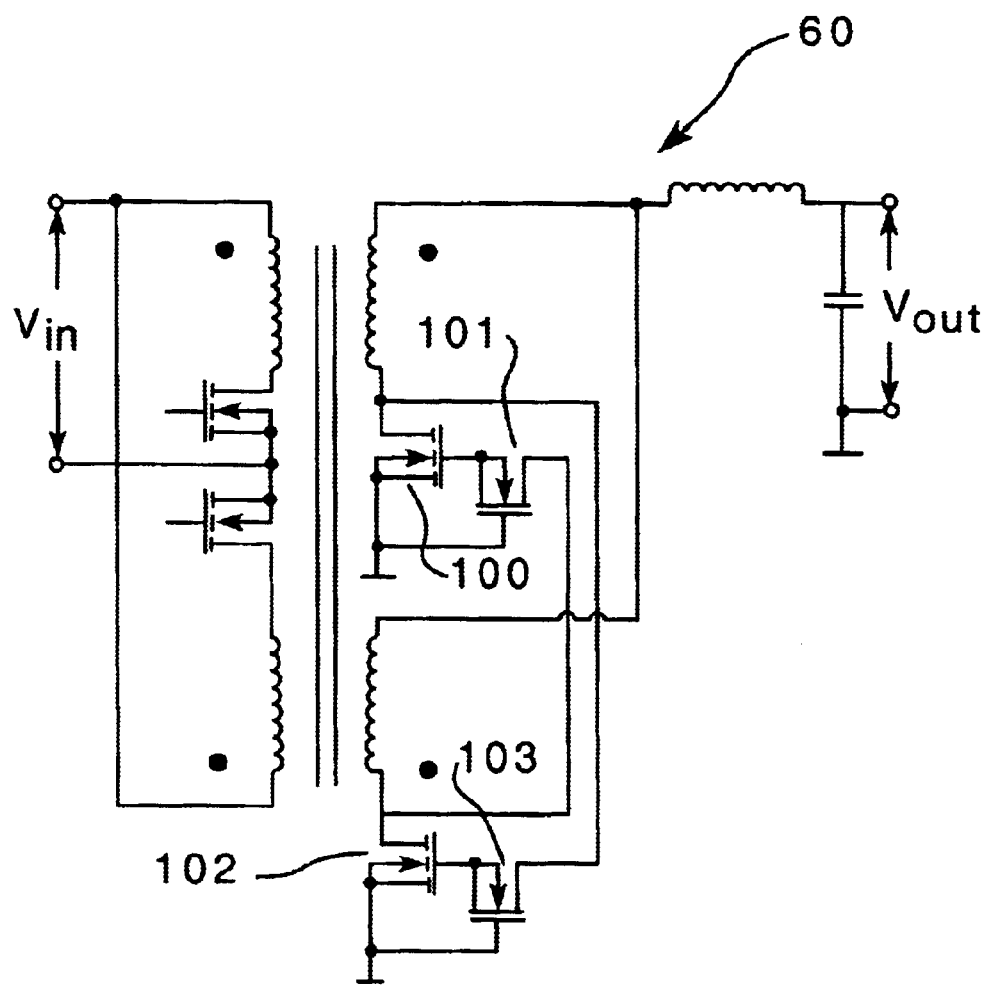
Figure 15:
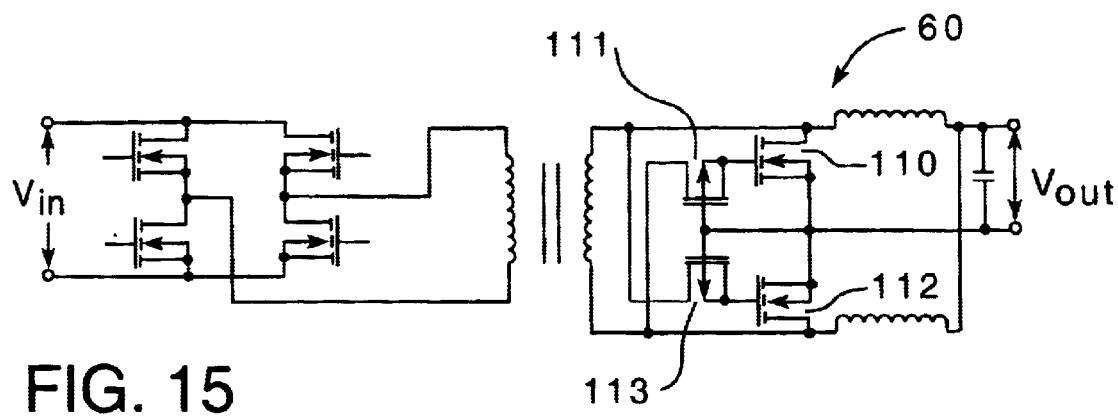

FIG. 13 is a schematic diagram of a half-bridge converter circuit 60 with full-wave rectification according to one embodiment of the present invention. The converter circuit 60 illustrated in FIG. 13 includes the drive circuits 100, 102 according to one embodiment of the present invention to limit the voltage applied to the conduction control terminals of the voltage-controlled switches 101, 103. FIG. 14 is a schematic diagram of a push-pull converter circuit 60 with full-wave rectification according to one embodiment of the present invention. The converter circuit 60 of FIG. 14 includes two drive circuits 100, 102 according to one embodiment of the present invention to limit the voltage applied to the conduction control terminals of the voltage-controlled switches 101, 103. FIG. 15 is a schematic diagram of a full-bridge converter circuit 60 with current-doubler rectification according to one embodiment of the present invention. The converter circuit 60 of FIG. 15 includes two drive circuits 110, 112 according to one embodiment of the present invention to limit the voltage applied to the conduction control terminals of the voltage-controlled switches 111, 113.

Figure 16:
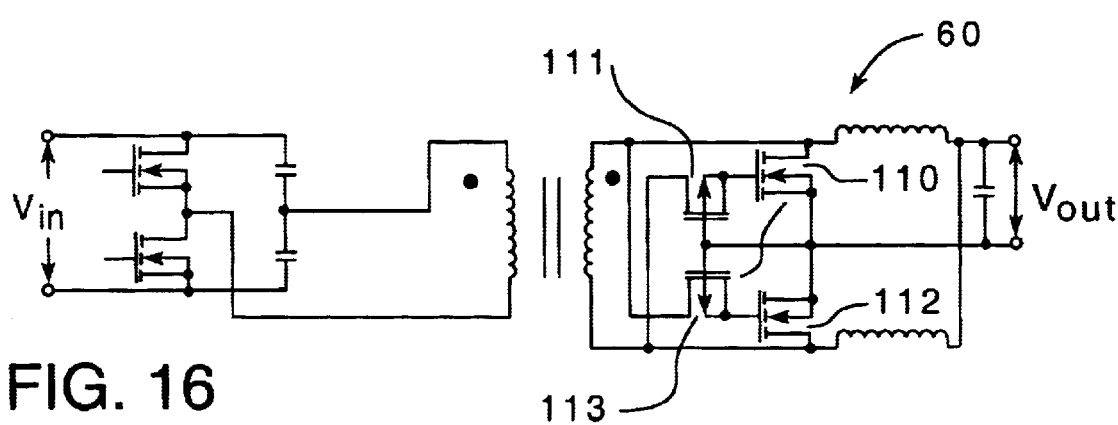
Figure 17:
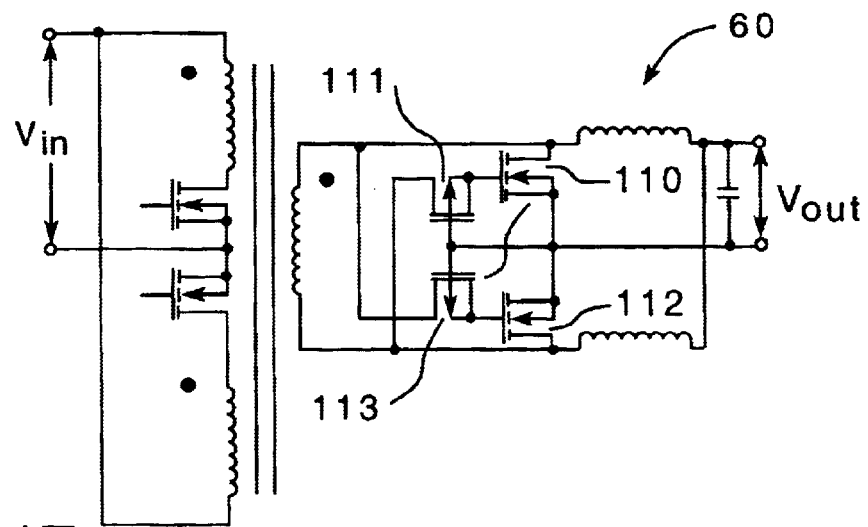

FIG. 16 is a schematic diagram of a half-bridge converter circuit 60 with current-doubler rectification according to one embodiment of the present invention. The converter circuit 60 of FIG. 16 includes two drive circuits 110, 112 according to one embodiment of the present invention to limit the voltage applied to the conduction control terminals of the voltage-controlled switches 111, 113. FIG. 17 is a schematic diagram of a push-pull converter circuit 60 with current-doubler rectification according to one embodiment of the present invention. The converter circuit 60 of FIG. 17 includes two drive circuits 110, 112 according to one embodiment of the present invention to limit the voltage applied to the conduction control terminals of the voltage-controlled switches 111, 113.

Figure 18:
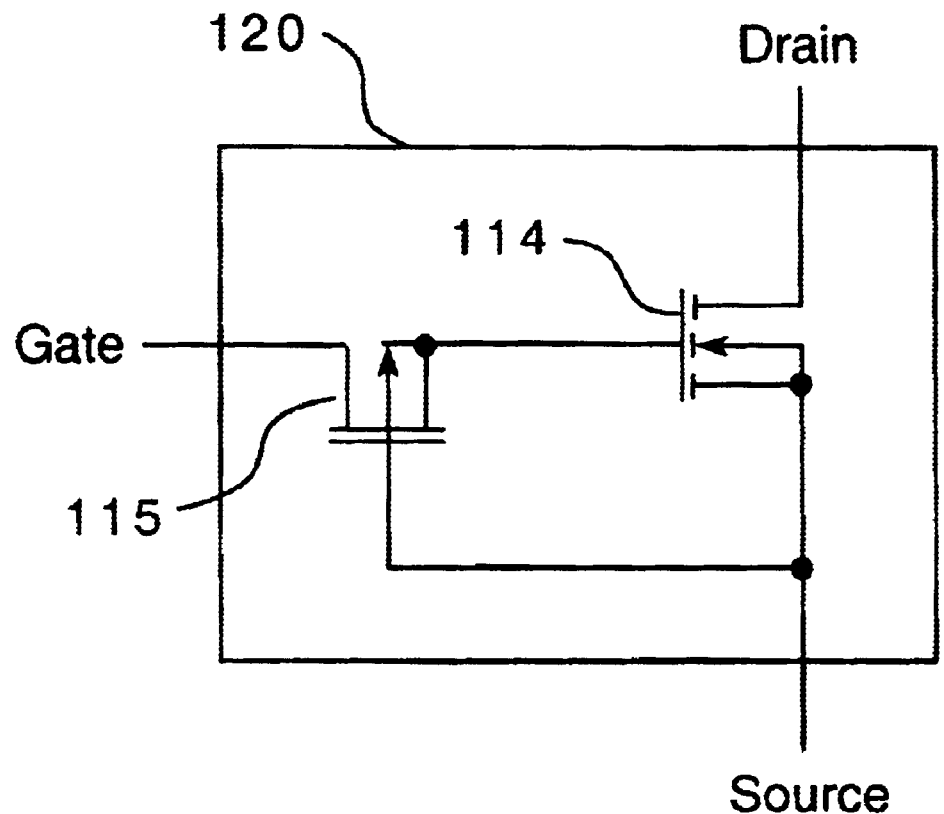
FIG. 18 is a diagram of a device according to another embodiment of the present invention.

FIG. 18 is a diagram of a device 120 according to another embodiment of the present invention. The device 120 includes a drive circuit 115 according to one embodiment of the present invention integrated with a voltage-controlled switch 114. The drive circuit 115 and the voltage-controlled switch 114 may be integrated together to form a single device 120 having a protected voltage-controlled switch 114 available as a three terminal (e.g., gate, source, and drain) device. To integrate the drive circuit 115 and the voltage-controlled switch 114, both may be fabricated on a single die of semiconductor material such as, for example, silicon. Although the drive circuit 115 illustrated in FIG. 18 includes a depletion mode MOSFET, according to other embodiments of the present invention, the device 120 may include, for example, the drive circuits 38 illustrated in FIGS. 5–7.

Although the present invention has been described herein with respect to certain embodiments, those of ordinary skill in the art will recognize that many modifications and variations of the present invention may be implemented. For example, the transformer 62 of the power converter circuit 60 may include multiple primary and/or secondary windings. The foregoing description and the following claims are intended to cover all such modifications and variations.

What is claimed is:

1. A power converter circuit, comprising:
   a transformer including a winding;
   a first synchronous rectifier having first and second terminals and a conduction control terminal, wherein the first and second terminals define a conduction path therebetween, and wherein the first terminal of the first synchronous rectifier is connected to a first terminal of the winding of the transformer; and
   a first normally-on switch having first and second terminals and a control terminal, wherein the first and second terminals of the first normally-on switch define a conduction path therebetween, and wherein the first terminal of the first normally-on switch is connected to a second terminal of the winding of the transformer, the second terminal of the first normally-on switch is connected to the conduction control terminal of the first synchronous rectifier, and the control terminal of the first normally-on switch is connected to the second terminal of the first synchronous rectifier.

2. The power converter circuit of claim 1, wherein the normally-on switch includes a depletion mode MOSFET.

3. The power converter of claim 2, further comprising:
a capacitor coupled to the control terminal of the first normally-on switch;
a first resistor coupled to the control terminal of the first normally-on switch, wherein the first resistor is in parallel with the capacitor; and
a second resistor connected between the control terminal of the first normally-on switch and the conduction control terminal of the first synchronous rectifier.

4. The power converter of claim 2, further comprising:
a voltage-limiting device coupled to the control terminal of the first normally-on switch; and
a resistor connected between the control terminal of the first normally-on switch and the conduction control terminal of the first synchronous rectifier.

5. The power converter of claim 4, wherein the voltage-limiting device includes a Zener diode.

6. The power converter circuit of claim 1, further comprising a second synchronous rectifier, the second synchronous rectifier having first and second terminals and a conduction control terminal, wherein the first and second terminals define a conduction path therebetween, and wherein the first terminal of the second synchronous rectifier is connected to the second terminal of the winding of the transformer, the second terminal of the second synchronous rectifier is connected to the second terminal of the first synchronous rectifier, and the conduction control terminal of the second synchronous terminal is connected to first terminal of the winding of the transformer.

7. The power converter circuit of claim 6, further comprising a second normally-on switch having first and second terminals and a control terminal, wherein the first and second terminals of the second normally-on switch define a conduction path therebetween, and wherein the first terminal of the second normally-on switch is connected to the first terminal of the winding of the transformer, the second terminal of the second normally-on switch is connected to the conduction control terminal of the second synchronous rectifier, and the control terminal of the second normally-on switch is connected to the second terminal of the winding.

8. The power converter circuit of claim 7, wherein the second normally-on switch includes a depletion mode MOSFET.

9. The power converter circuit of claim 1, wherein the power converter circuit is selected from the group consisting of a forward converter circuit, a half-bridge converter circuit, and a push-pull converter circuit.

* * * * *